(12) United States Patent
Mayerle

(10) Patent No.: US 7,100,522 B2
(45) Date of Patent: Sep. 5, 2006

(54) EQUALIZING METER DEVICE

(75) Inventor: Dean J. Mayerle, Saskatoon (CA)

(73) Assignee: CNH Canada, Ltd., Racine, WI (US)

( * ) Notice: Subject to any disclaimer, the term of this patent is extended or adjusted under 35 U.S.C. 154(b) by 94 days.

(21) Appl. No.: 10/813,225

(22) Filed: Mar. 30, 2004

(65) Prior Publication Data

US 2005/0217551 A1  Oct. 6, 2005

(51) Int. Cl.
*A01C 7/20* (2006.01)
(52) U.S. Cl. .................... 111/179; 111/177
(58) Field of Classification Search ............. 111/177, 111/178, 179, 182; 222/410
See application file for complete search history.

(56) References Cited

U.S. PATENT DOCUMENTS

| | | | |
|---|---|---|---|
| 547,016 A | 10/1895 | Kimball | |
| 654,057 A | 7/1900 | Fowle | |
| 1,291,151 A | 1/1919 | Robinson | |
| 3,851,604 A | 12/1974 | Seifert, Jr. | |
| 4,379,664 A * | 4/1983 | Klein et al. ................ | 406/68 |
| 4,779,765 A | 10/1988 | Neumeyer | |
| 5,003,894 A * | 4/1991 | Lafferty .................... | 111/178 |
| 5,826,523 A | 10/1998 | Gregor | |
| 5,845,818 A | 12/1998 | Gregor et al. | |
| 5,855,303 A | 1/1999 | Gregor | |
| 5,878,679 A | 3/1999 | Gregor et al. | |
| 5,924,370 A | 7/1999 | Gregor et al. | |
| 5,947,040 A | 9/1999 | Gregor | |
| 5,980,163 A | 11/1999 | Gregor et al. | |
| 5,996,515 A | 12/1999 | Gregor et al. | |
| 6,138,591 A | 10/2000 | Horsch | |
| 6,158,630 A | 12/2000 | Mayerle et al. | |
| 6,216,615 B1 * | 4/2001 | Romans ..................... | 111/177 |
| 6,240,861 B1 | 6/2001 | Memory | |
| 2003/0141086 A1 | 7/2003 | Kovach et al. | |

* cited by examiner

*Primary Examiner*—Daniel P. Stodola
*Assistant Examiner*—Julianne Cozad
(74) *Attorney, Agent, or Firm*—Rebecca Henkel

(57) ABSTRACT

A system for and a method of metering product includes an equalizing meter apparatus that more readily equalizes the distribution of product with uneven distribution systems. The metering system includes a meter roller assembly operable to meter granular product delivery between a meter box and a series of product distributors. The meter roller assembly includes a shaft in support of a series of roller sections rotatably mounted on the shaft. The roller sections include at least one fluted metering section having a series of fluted segments configured to meter granular product. The equalizing meter apparatus includes a split ring having a series of protrusions configured to engage the fluted segments of the metering section and enhance equalizing the distribution of granular product from the meter roller assembly. The split ring is operable to detach from and reconnect to the fluted metering section without disassembling the meter roller assembly.

9 Claims, 5 Drawing Sheets

EQUALIZING METER DEVICE

BACKGROUND OF THE INVENTION

1. Field of the Invention

The invention relates to an implement for metering product in an agricultural environment and, more particularly, relates to a metering roller assembly employing an equalizing device configured to enhance the metering of seed or other particulate material for application in an agricultural environment.

2. Discussion of the Related Art

Air seeders are commonly towed by tractors to apply seed, fertilizer, or micro-nutrients or any granular product to a field. It is generally advantageous to tow an air seeder in combination with a tilling implement, one behind the other, to place the seed and fertilizer under the surface of the soil. An air seeder has as its central component a wheeled seed cart which comprises one or more frame-mounted seed tanks for holding product, generally seed or fertilizer or both. Air seeders also generally include a volumetric metering system operable to measure a fixed volume of seed per unit of linear distance and a pneumatic distribution system for delivering the product from the tank to the soil.

The volumetric metering system is configured for distribution of product from the tank to the distribution headers of the seed tubes. The metering system typically includes a meter roller assembly employing augers or fluted cylinders (meter rollers) situated in a meter box assembly secured to below the tank.

Typically the meter box will have a series of outlets known as runs that each leads through the distribution lines of the pneumatic distribution system. The pneumatic distribution system generally includes an air stream operable to carry product metered by the meter roller assembly through the distribution lines to a series of secondary distribution manifolds ("headers"), which in turn distribute product to a group of ground openers mounted on the seeding implement operable to place seed in the ground. The ground openers are configured to evenly deliver the product to the span of ground (the "seedbed") acted upon by the seeding implement.

The distribution headers ideally have product requirements proportional to the number of ground openers that they service. Since the number of ground openers is often not evenly divisible by the number of distribution headers, one distribution header may service a different number of ground openers than another header. Because a distribution header has one outlet port for each ground opener that it services, headers often have varying numbers of outlet ports. Therefore, in order to evenly distribute product across the width of the seeding implement, product seen by a secondary distribution header servicing ten ground openers, for example, should be less than (⅚) the amount of product seen by a secondary distribution header servicing twelve ground openers. It follows that a metering system associated with the secondary distribution header servicing fewer ground openers should therefore supply a lesser volume of product.

However, conventional air seeders are typically unable to properly ration product to secondary distribution headers, and therefore have problems maintaining an acceptable distribution of seed or fertilizer across the width of the seeding implement. Therefore, it is desirable to devise a metering system which can accommodate varying product requirements seen by individual meter roller assemblies which are driven by a common shaft. It is also desirable to devise a metering system which, in conjunction with a pneumatic distribution system and a seeding implement, provides substantially uniform product distribution across the seedbed.

Various approaches have been used in the past to meter product. One known attempt includes providing a metering system employing a meter roller assembly having metering sections that are divided between fluted (or active) segments and blank (or inactive) segments. Depending on the number of distribution headers, the meter roller assembly will consist of fluted metering sections corresponding to runs which are operational and blank roller spacers extending across the width of the runs which are not operational. Product is then delivered to the distribution headers which are connected to the runs containing the fluted metering sections, and no product is delivered from those runs which are, in effect, blanked off.

Known segmented meter roller systems for the metering of product have several drawbacks. U.S. Pat. No. 5,924,370 discloses a meter roller assembly that employs an equalizing disc to vary the amount of product by each fluted metering roller assembly. However, the equalizing disc is friction fit to the respective metering section. Therefore, the meter roller assembly must be taken apart to reconfigure placement of the equalizing disc on the desired metering section. U.S. Pat. No. 6,158,630 discloses a known segmented meter roller system that employs a meter roller assembly having an equalizing meter device operable to reduce the product flow in each distribution line. However, the configuration of the meter roller assembly needs to be known before assembling the meter roller sections and the respective equalizing meter device. Therefore, the known equalizing meter devices are not easily placed on a roller assembly after the meter roller assembly is factory assembled. Furthermore, the known equalizing meter devices are not detachable and re-attachable to the meter section after factory assembly.

Therefore, a need has arisen to provide an equalizing meter device and a method thereof that enables an operator to readily equalize a distribution of product by a meter roller assembly after factory assembly.

SUMMARY OF THE INVENTION

The present invention provides a system for and a method of metering product that more readily equalizes the distribution of product with uneven distribution systems.

In a first embodiment of the present invention, a meter roller assembly of an agricultural implement meters granular product delivery between a meter box and a series of product distributors. The meter roller assembly includes a shaft configured to rotate in the meter box and a plurality of roller sections rotatably mounted on the shaft. The plurality of roller sections includes at least one metering section that corresponds to at least one of the plurality of product distributors. At least one metering section includes a series of fluted segments configured to meter the granular product. The meter roller assembly also includes an equalizing apparatus having a series of protrusions configured to engage the fluted segments of the metering section. Thereby, the equalizing apparatus enhances the distribution of granular product from the meter roller assembly. The equalizing apparatus is selectively operable to detach from and reconnect to the metering section without disassembling the meter roller assembly. One embodiment of the equalizing apparatus includes a split ring having an opening operable to receive a fastener. The fastener is configured to extend through the opening to engage the fluted metering section, thereby securing the position of the equalizing apparatus on the split ring.

In another embodiment, the present invention provides an agricultural seeding implement that includes a frame operable to be towed by a tow vehicle, a product tank mounted on the frame and configured to retain a supply of granular product, a meter box is configured to meter the supply of granular product to a conveyance system. The conveyance system conveys the granular product to a granular product distributor configured to distribute the granular product in an agricultural setting. The implement further includes a metering assembly configured for metering granular product delivery between the meter box and the product distributors. The metering assembly includes a shaft configured to rotate in the meter box, and a plurality of roller sections rotatably mounted on the shaft. The plurality of roller sections includes at least one metering section corresponding to at least one of the plurality of product distributors. At least one metering section includes a series of fluted segments configured to meter delivery of granular product. The implement further includes an equalizing apparatus having a series of protrusions configured to engage the fluted segments of the metering section. The equalizing apparatus is selectively detachable from and reconnectable to the metering section without disassembly of the metering apparatus.

The present invention also provides a method of equalizing a flow of granular product by a metering system, the metering system including a pre-assembled plurality of meter roller sections secured on a shaft with a shaft fastener. The method includes the acts of attaching an equalizing meter apparatus to one of more plurality of meter sections pre-assembled on the shaft; securing a position of the equalizing meter apparatus; detaching the equalizing meter apparatus from the metering system without disassembling the metering system; and re-connecting the equalizing meter apparatus to the pre-assembled metering system.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of metering assemblies for metering product could be constructed in accordance with the invention defined by the claims. Hence, while preferred embodiments of the invention will now be described with reference to a seed product conveyed by an air cart, it should be understood that the invention is in no way so limited. The type of forced air conveying apparatus or machine (e.g., spreader, etc.) can vary. While the description refers to use of the present invention to convey seed product, the invention can be utilized to convey a wide variety of product (e.g., seed, fertilizer, herbicide, pesticide, micro-nutrients, etc.) and is not limiting on the invention. In addition, the type and size of the seed product (e.g., soybean, corn, cereal grains, oil seeds, etc.) can vary.

Figure 1:
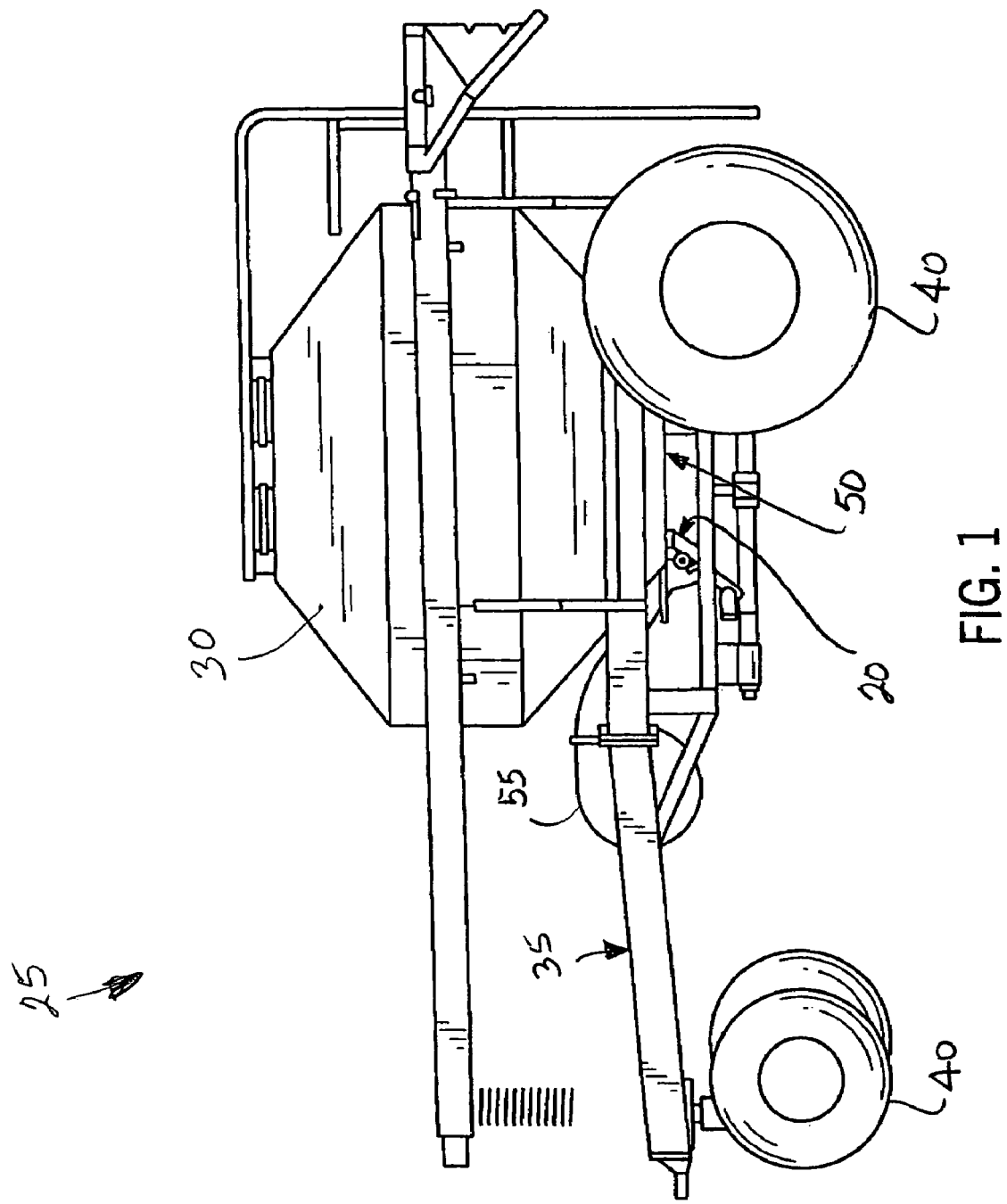
FIG. 1 illustrates an air cart in accordance with the present invention.
Figure 2:
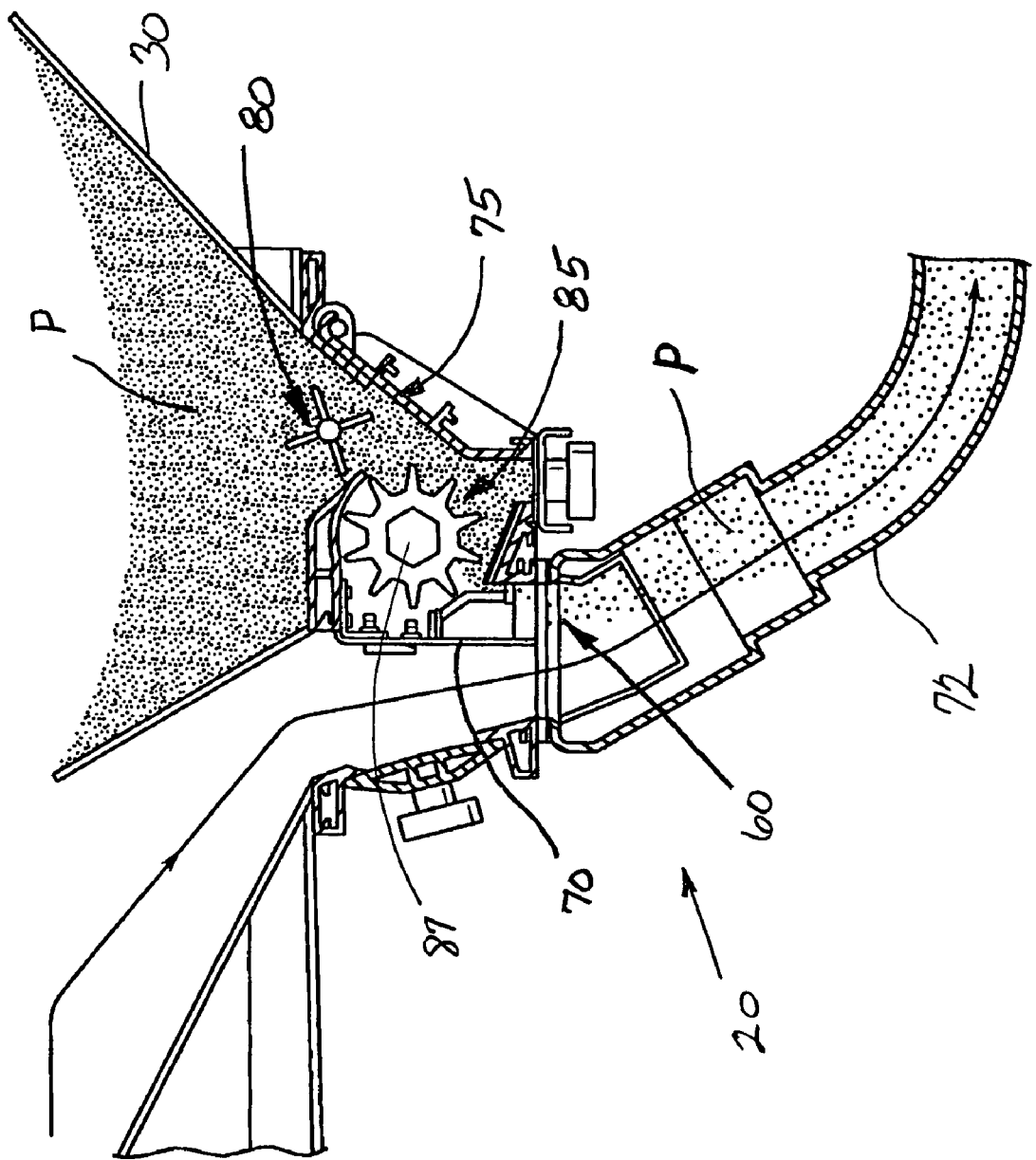
FIG. 2 illustrates detailed cross-section view illustrating the meter box assembly of the air cart of FIG. 1.
Figure 3:
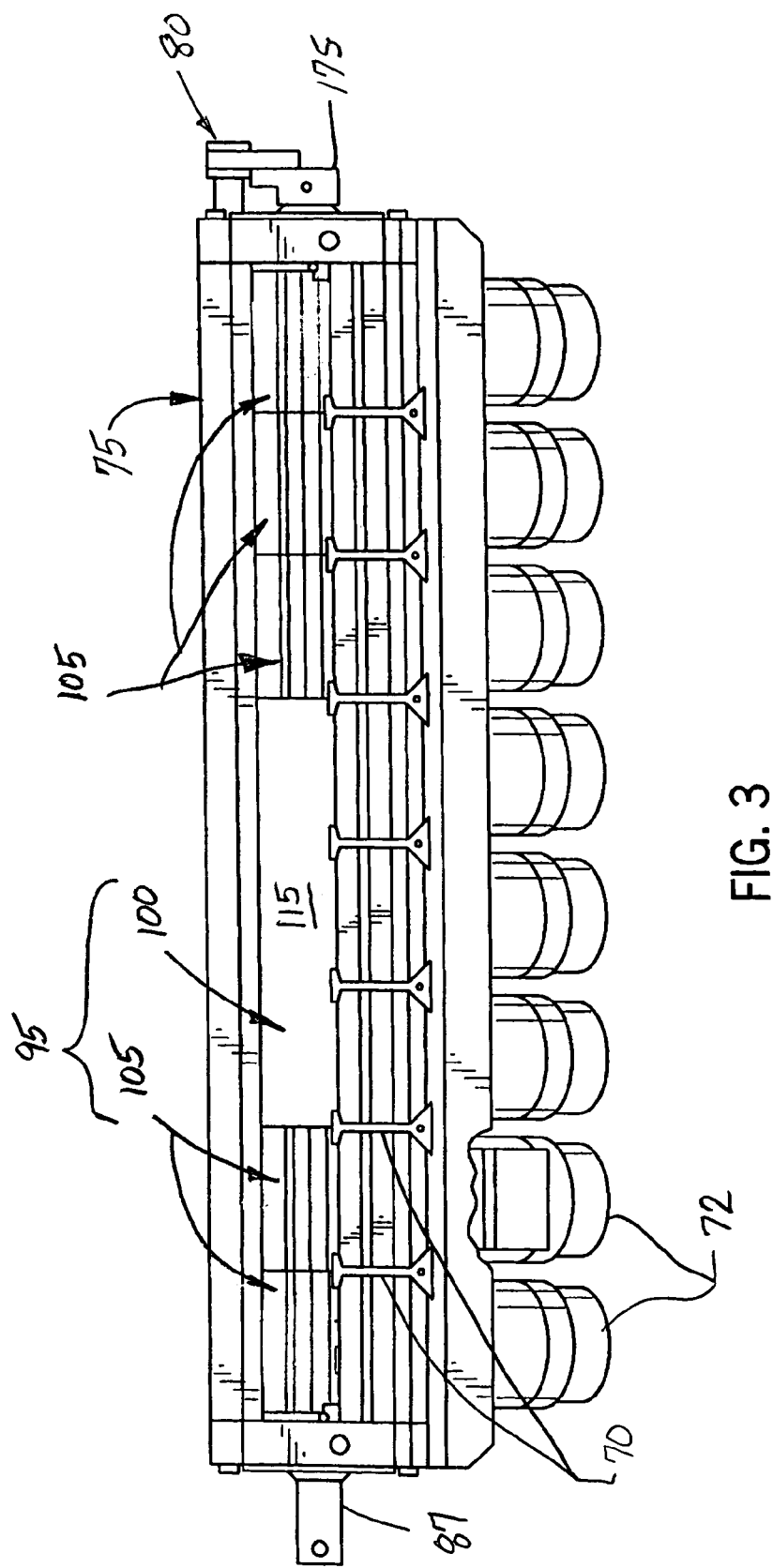
FIG. 3 illustrates a detailed plan view of the metering system of FIG. 1.

Referring to FIGS. 1–3, a metering system 20 in accordance with a first embodiment of the present invention is combined with an agricultural implement. The preferred agricultural implement shown is a conventional air cart 25. The air cart 25 is of a known general configuration and comprises a tank 30, or optionally a number of tanks (not illustrated), which may be mounted on a frame 35, which is in turn carried on wheels 40. The metering system 20 is mounted on the bottom 50 of the tank 30. A blower 55 forces air past the outlet 60 of the metering system 20 to carry product P from the metering system 20 to appropriate runs to distribution headers on a soil working implement (headers and implement not shown).

A series of dividers 70 at the metering system outlet 60 define the series of runs which direct product P into a corresponding series of distribution lines 72 leading to the distribution headers on the soil working implement. In addition to dividers 70, the metering system 20 includes a meter box 75 having an agitator 80 and a meter roller assembly 85 in accordance with the present invention.

Figure 4:
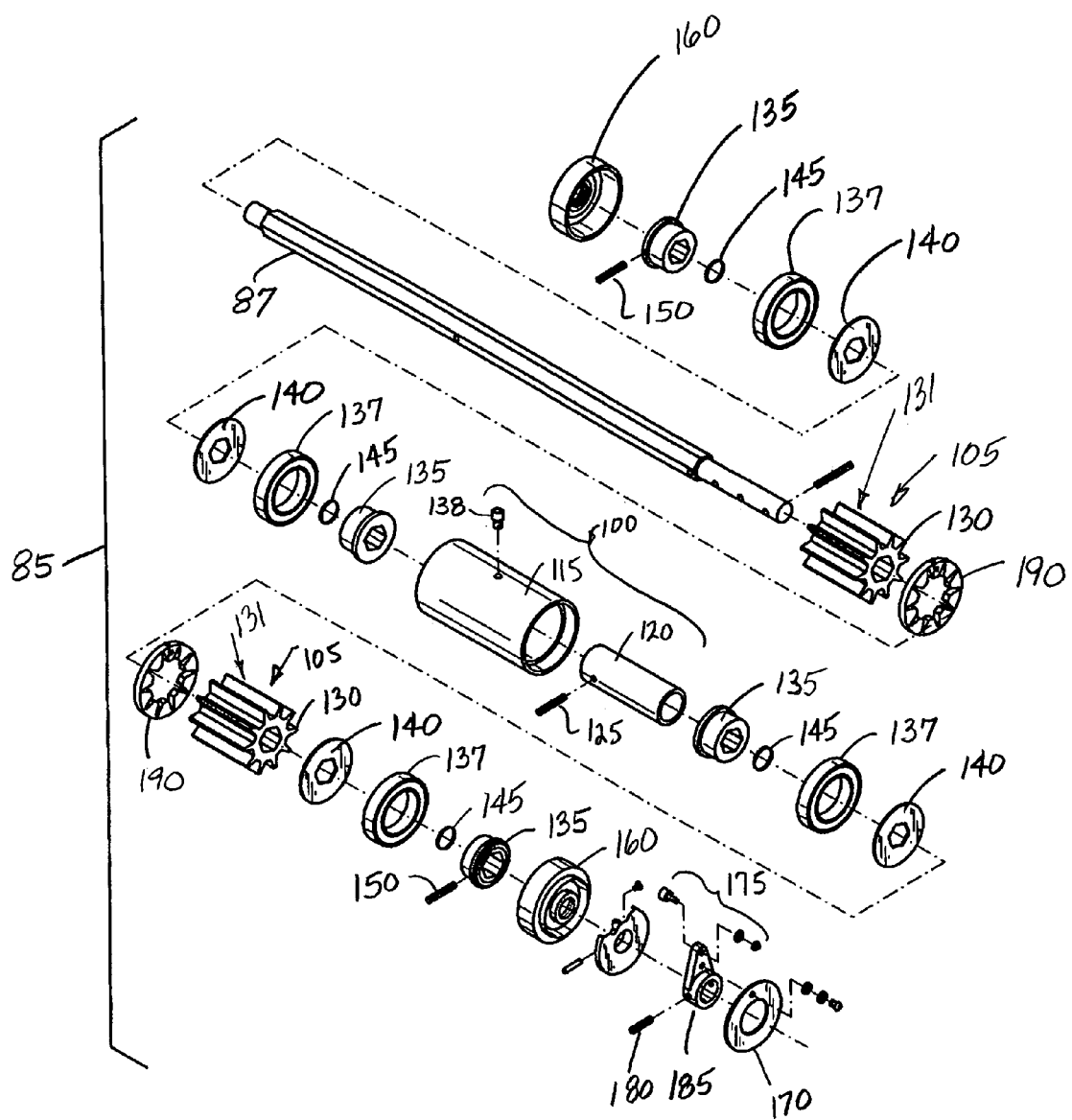
FIG. 4 shows an exploded view of a meter roller assembly in accordance with the present invention.

Referring to FIGS. 3 and 4, one embodiment of the meter roller assembly 85 in accordance with the present invention includes a shaft 87 (preferably of hexagonal configuration) configured for rotation in the meter box 75 of the air cart 25. The shaft 87 is preferably driven by a hydraulic motor, but the type of drive can vary.

The meter roller assembly 85 is configured for an air cart 25 having several runs, and the number of runs can vary. The metering roller assembly 85 includes one or more metering sections 95 in communication with a respective run 72. The one or more metering sections 95 can include blank sections 100 and fluted metering sections 105. The blank section 100 includes an outer spacer 115 and an inner spacer 120 and a pin 125 configured to blank out unused runs. Preferably, the unused runs are centrally grouped so that a single extended blank section 100 can be used across the unused runs. The fluted metering sections 105 include a plurality of extensions or flutes 130 radially configured to meter the delivery of product to the distribution lines. The fluted metering sections 105 include a coarse metering section 131, a fine metering section (not shown), and an extra-fine metering section (not shown). The size and proportions of the flutes 130 and the type of metering sections 105 can vary depending on the type of metered product and the volume required. The disposition of the metering sections 105 can vary.

Referring to FIG. 4, a series of bearing seats 135 abut against the inner spacer 120 and include a hexagonal bore so that the bearing seats 135 rotate with the shaft 87. The bearing seats 135 abut a machined shoulder within the outer spacer 115. When bearings 137 are seated on the seats 135, the outer races of the bearings 137 are in frictional engagement with the outer spacer 115, thus allowing the inner spacer 120 to rotate, while the outer spacer 115 is held against rotation by virtue of the cap screw 138 abutting against a part of the top of the meter box 75. A bearing shield 140 is forced against the surface of the bearing seat 135 to engage an 0-ring seal 145 between the two.

The metering sections 100 and 105 abut against the bearing shields 140. Outer bearing seats 135 carry similar bearings 137 separated from the outer ends of the metering roller sections 100 and 105 by a second set of bearing shields 140. The outer bearing seats 135 are pinned by associated pins 150 to maintain the position of the sections 100 and 105 between them. The outer bearings 137 receive the shaft 87. The number of bearings 137 can vary from a roller assembly 85 without a center blank section to roller assembly 85 with a center blank section 100. Thereby, the metering sections and the blank sections simply abut one another.

Still referring to FIG. 4, preferably the metering sections 100 and 105 somewhat compress together for sealing purposes. The outer seats 135 and their associated pins 150 generally maintain the compression across the metering roller assembly 85. Covers 160 are applied at the end of the roller assembly 85 to seal the meter roller assembly 85 to the meter box 75.

Referring to FIGS. 2–4, the other end of the meter roller assembly 85 includes an identification disk 170 operable to identify the type of metering roller assembly 85 (e.g., metering extra fine, fine, or coarse granular product). A cam arrangement 175 is fixed to the end of the shaft 87 by a pin 180 and is operable to drive the agitator 80 (FIG. 2) to ensure smooth flow of product P from the product tank 30 into the meter box 75.

Referring to FIGS. 2 and 3, the combined width of the fluted metering sections 105 and the blank sections 100 is essentially the same as the width of the meter box 75. In a typical air cart 25, there might be eight runs emanating from the meter box 75 and thus up to eight metering sections. Typically a run is about three inches wide, so that the metering roller assembly 85 would then be about twenty-four inches long. The variety of fluted metering sections 105 and blank sections 100 are interchangeable on the shaft 87.

FIGS. 3 and 4 illustrate that the meter roller assembly 85 includes a large number of compressed pieces that is difficult to manufacture and assemble due to the possibility of the tolerances on each piece adding together in the assembly process. Although compression of the meter roller assembly 85 eliminates bearing contamination by the product, a drawback is that the compression causes difficulty in assembling the meter roller assembly 85 without specific tooling.

To reduce inventory and re-assembly costs, the meter roller assembly 85 of the present invention includes an equalizing meter apparatus 190. The equalizing meter apparatus 190 is configured to mount on one or more of the flutes 130 of the fluted metering sections 105 of the meter roller assembly 85 after the configuration of the seeding implement is known and the metering roller assembly 85 is pre-assembled.

Figure 5:
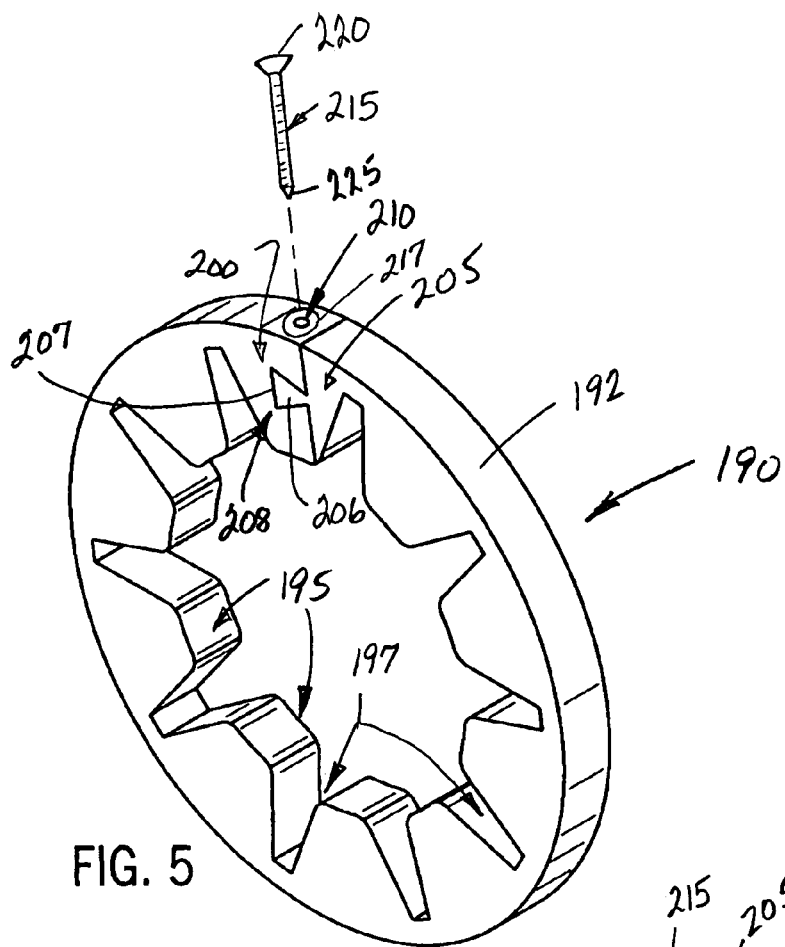
FIG. 5 illustrates a detailed perspective view of an equalizing meter device of FIG. 4.
Figure 6:
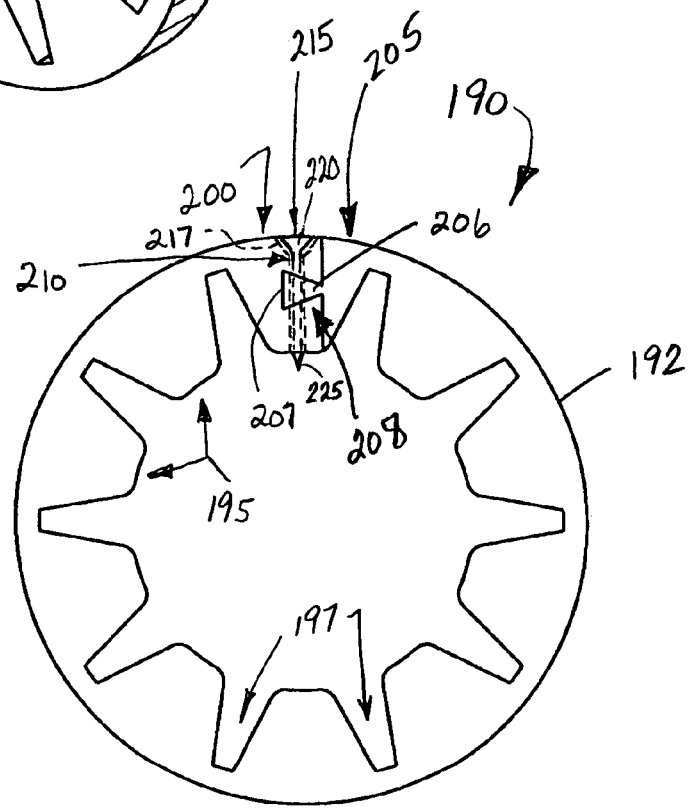
FIG. 6 illustrates a detailed front view of the equalizing meter device of FIG. 5.

FIGS. 5 and 6 illustrate detailed views of a preferred embodiment of the equalizing meter apparatus 190. The preferred equalizing meter apparatus 190 includes a disc-shaped split-ring 192 having a series of protrusions 195 and valleys 197 configured to engage or mate with the flutes 130 of the fluted metering sections 105 of the meter roller assembly 85. The equalizing meter apparatus 190 further includes a first free end 200 and a second free end 205 configured to be separable by an applied force to selectively detach and attach the equalizing meter apparatus 190 without disassembling the meter roller assembly 85. The spring tension of the equalizing meter apparatus 190 then brings to free ends 200 and 205 together to attach the apparatus 190 to the fluted meter section 105.

A preferred embodiment of the free end 205 includes an extension 206 that is trapezoidal-shaped having a free end wider relative to a coupled end. The free end 200 includes a trapezoidal-shaped notch 207 having a narrowing opening relative to a wider base. The trapezoidal shaped notch 207 of end 200 is configured to receive the trapezoidal shaped extension 206 of end 205, forming a dovetail joint 208. The dovetail joint 208 secures a position of the equalizing meter apparatus 190 on a fluted metering section 105. The ends 200 and 205 are further configured to include an opening 210 extending through the dovetail joint 208 coupling the free ends 200 and 205 and fluted meter sections 105. The opening 210 is preferably a hole operable to receive a fastener 215 to secure the dovetail joint 208. The fastener 215 and dovetail joint 208 secure the equalizing meter apparatus 190 in position on the fluted metering section 105.

A preferred fastener 215 is a self-tapping threaded screw. One end 220 of the fastener 215 is configured to insert flush with a tapered portion 217 of the opening 210 at the exterior edge of the disc-shaped apparatus 190. The other end 225 of the fastener 215 is configured to extend beyond the opening 210 and engage or embed into the meter section 105, thereby securing the equalizing apparatus 190 in position on the fluted meter section 105. The type of opening 210 (e.g., threaded or unthreaded) and the type (e.g., bolt, threaded screw, etc.) of fastener 215 can vary. Furthermore, the fastener 215 can be secured to the fluted meter section 105 using other types of securing means (e.g., latch, clamp, etc.). Another embodiment of the equalizing meter apparatus can include a split ring having a first leg and a second leg pivotal about a hinge.

If the air cart 25 is connected to a different seeding implement with a different distribution system, the equalizing meter apparatus 190 can be detached and easily re-connected when required without disassembly and re-assembly of the meter roller assembly 85. In contrast, known meter roller assemblies must be re-configured (i.e., disassembled and re-assembled) to attach and/or remove a known equalizing meter apparatus and equalize uneven distribution of different types of products to different soil implements with different distribution line configurations. The equalizing meter apparatus 190 of the invention also saves a farmer from having to purchase additional roller sections to minimize the workload.

Referring to FIGS. 4 and 5, the equalizing meter apparatus 190 is preferably placed toward a center of the metering section 105 to normalize metering efficiencies with different products. The dovetail joint 208 and the fastener 215 secure and hold the position of the equalizing meter apparatus 190 on the meter section 105. If the equalizing meter apparatus 190 were to drift to one side of the fluted metering section 105, the characteristics of the metering operation would change.

One embodiment of the fluted metering sections 105 and the equalizing meter apparatus 190 are comprised of polyurethane material, but the composition of the equalizing meter apparatus 190 can vary. Any suitable adhesive may be used for joining the fluted metering sections of the meter roller assembly 85 where the sections 105 are molded separately and then joined. However, the equalizing meter apparatus 190 allows variations in the construction of the fluted metering sections 105 and blank sections 100 as a single molded unit. This has the advantage that metered product is prevented from contaminating the meter roller assembly and the metering system. In contrast, known meter roller assemblies 85 are assembled at individual blank sections 100 in order to attach and detach known equalizing meter devices.

In operation, one aspect of the equalizing meter apparatus 190 is to allow the meter roller assembly 85 to operate at an increased rotational speed, as measured in rotations per minute (rpms). At the increased rotational speed, any given meter roller assembly 85 is operable to deliver a larger quantity of product P.

The equalizing meter apparatus 190 of the present invention is configured to decrease the capacity of the fluted metering section 105 of the metering roller assembly 85 in delivering product to the distribution system. Thereby, the shaft 87 can be operated at higher rotational speed while delivering the same amount of product P to the distribution header at the soil implement as would have been delivered under a full-width fluted metering section. This aspect of the equalizing meter apparatus 190 allows product P to be readily handled which could not have been handled at a lower rotational speed. A drawback of known meter roller assemblies in delivering product P at a lower rotational speed (e.g. 2 rpm) is causing significant time periods when no flow of product P is moved during a pass of the flute 130. These time periods of not product flow results in an undesirable pulsing effect in the delivery of product P. Known meter roller assemblies are particularly known to cause time periods of no-flow in the delivery of large-size, low-volume product P (e.g., corn) at a sufficiently low rpm (e.g., 2 to 3 rpm) to efficiently deliver proper amounts of the product P. The equalizing meter apparatus 190 of the invention is configured to allow the meter roller assembly 85 of the present invention to operate at an increased rotational speed, (e.g., 4 to 6 rpm), thereby enhancing the ability of the meter roller assembly 85 to more readily handle the larger-sized, low-volume types of product P. The equalizing meter apparatus 190 also enhances efficient operation of variable rate hydraulic drives at the increased rotational speed.

The embodiments of the metering system 20 and meter roller assembly 85 described above is described in combination with the standard air cart 25 having the central hopper tank 30 and the pressurized air source 55. However, it is understood that the metering system 20 of the present invention is adaptable for use with a stand-alone blower and/or a product storage tank, as well as adapted for incorporating with other types of agricultural implements mounted on a planter (e.g., no air cart). Furthermore, each of the above described embodiments of the metering system 20 of the invention can be constructed integrally with an air cart 25, or as a modular unit that can be coupled to a pre-assembled standard air cart structure.

Furthermore, one skilled in the art will recognize that the present invention is not limited to the conveyance of seed product. The present invention can be used to convey numerous types of products (e.g., seed, fertilizer, herbicides, pesticides, micro-nutrients, etc.) that exhibit suitable properties for forced air conveyance.

Many changes and modifications could be made to the invention without departing from the spirit thereof. The scope of these changes will become apparent from the appended claims.

I claim:

1. An equalizing meter apparatus operable to equalize a delivery of granular product by a pre-assembled meter roller assembly of an agricultural implement between a meter box and a plurality of product distributors, the equalizing meter apparatus comprising:

a plurality of fluted metering sections rotatably mounted on and compressed together across a shaft, wherein each fluted metering section includes a plurality of radial outward extended fluted segments configured to meter the delivery of the granular product to at least one of the plurality of product distributors; and an equalizing apparatus having a plurality of inward protrusions configured to engage the plurality of the fluted segments of the metering section, wherein the equalizing apparatus includes means for selectively detaching and reconnecting to the metering section of the pre-assembled meter roller assembly without losing compression of the plurality of fluted metering sections across the shaft.

2. The equalizing meter apparatus as recited in claim 1, wherein the equalizing apparatus further includes a fastener and a fastener opening, the fastener configured to extend through the fastener opening in the equalizing apparatus and engage the metering section.

3. The equalizing meter apparatus as recited in claim 1, wherein the equalizing apparatus includes a split ring having a first free end and a second free end, the split ring configured to encircle the metering section.

4. The equalizing meter apparatus as recited in claim 3, wherein the first and second free ends of the split ring are configured to couple with each other, the coupled free ends defining a dovetail joint.

5. The equalizing meter apparatus as recited claim 3, further including fastener and a fastener opening, the fastener opening extending through the first and second free ends of the split ring, the fastener opening configured to receive the fastener, the fastener coupling the first and second free ends of the split ring.

6. The equalizing meter apparatus as recited in claim 3, further including an fastener and a fastener opening, the fastener opening extending through the first and second free ends of the split ring, wherein the first and second free ends of the split ring are configured to couple and define a dovetail joint that secures the split ring to the metering section, and wherein the fastener extends through the fastener opening in the split ring such that the fastener secures the dovetail joint defined by the free ends of the split ring.

7. The equalizing meter apparatus as recited in claim 6, wherein the fastener is a self-tapping screw configured to extend beyond the fastener opening through the split ring and engage the metering section.

8. An equalizing meter apparatus operable to equalize a delivery of granular product by a pre-assembled meter roller assembly of an agricultural implement between a meter box and a plurality of product distributors, the equalizing meter apparatus comprising:

a fluted metering section rotatably mounted between a pair of bearing plates on a shaft, wherein the fluted metering section includes a plurality of radial outward extended fluted segments configured to meter the delivery of the granular product; and an equalizing apparatus having a plurality of inward protrusions configured to engage the plurality of the fluted segments of the fluted segment of the metering section, wherein the equalizing apparatus includes a first free end and a second free end configured to separate apart so as to receive the fluted segment of the metering section therethrough and encircle the metering section.

9. The equalizing apparatus of claim 8, wherein the first and second free ends of the equalizing apparatus encircling the fluted segment of the metering section are coupled to one another by a fastener.

* * * * *